United States Patent
Nanduri et al.

(10) Patent No.: US 7,251,249 B2
(45) Date of Patent: Jul. 31, 2007

(54) INTEGRATED HIGH SPEED SWITCH ROUTER USING A MULTIPORT ARCHITECTURE

(75) Inventors: Bhanu Nanduri, Union City, CA (US); Chitranjan N. Reddy, Los Altos, CA (US)

(73) Assignee: Tundra Semiconductor Corporation, Ottawa, Ontario (CA)

( * ) Notice: Subject to any disclaimer, the term of this patent is extended or adjusted under 35 U.S.C. 154(b) by 1217 days.

(21) Appl. No.: 09/769,929

(22) Filed: Jan. 24, 2001

(65) Prior Publication Data

US 2001/0038636 A1   Nov. 8, 2001

Related U.S. Application Data

(60) Provisional application No. 60/178,218, filed on Jan. 26, 2000.

(51) Int. Cl.
*H04L 12/54* (2006.01)
(52) U.S. Cl. ............... 370/429; 370/422; 370/428
(58) Field of Classification Search ........... 370/351, 370/389–390, 392, 400, 412–413, 415, 417, 370/422, 423, 428, 429
See application file for complete search history.

(56) References Cited

U.S. PATENT DOCUMENTS

| | | | | |
|---|---|---|---|---|
| 4,630,240 A * | 12/1986 | Poteet et al. | ........... | 365/189.05 |
| 5,640,366 A * | 6/1997 | Majos et al. | ........... | 365/239 |
| 6,138,219 A * | 10/2000 | Soman et al. | ........... | 711/149 |
| 6,212,597 B1 * | 4/2001 | Conlin et al. | ........... | 711/105 |
| 6,378,060 B1 * | 4/2002 | Hansen et al. | ........... | 712/32 |
| 6,480,941 B1 * | 11/2002 | Franke et al. | ........... | 711/153 |
| 6,577,636 B1 * | 6/2003 | Sang et al. | ........... | 370/395.7 |
| 6,650,637 B1 * | 11/2003 | Bansal et al. | ........... | 370/360 |
| 6,724,769 B1 * | 4/2004 | Sang | ........... | 370/429 |
| 7,017,136 B2 * | 3/2006 | Ting | ........... | 716/12 |

\* cited by examiner

*Primary Examiner*—Huy D. Vu
*Assistant Examiner*—Jason Mattis
(74) *Attorney, Agent, or Firm*—Stallman & Pollock LLP

(57) ABSTRACT

A switch/router circuit integrates a multi-port memory array with the Media Access Control (MAC) units to facilitate direct transfer of packet payloads to the destination port. The store and forward functions are performed using a single memory cell with multiple pass gates, one pass gate designated for each MAC port. That is, a switch router is implemented using the multi-port memory array such that the number of ports in each memory cell is proportional to the number of MACs integrated in the single monolithic chip. An arbitrator arbitrates between the integrated ports, a lookup table identifies the destination port and a system controller controls all of the integrated elements.

4 Claims, 6 Drawing Sheets

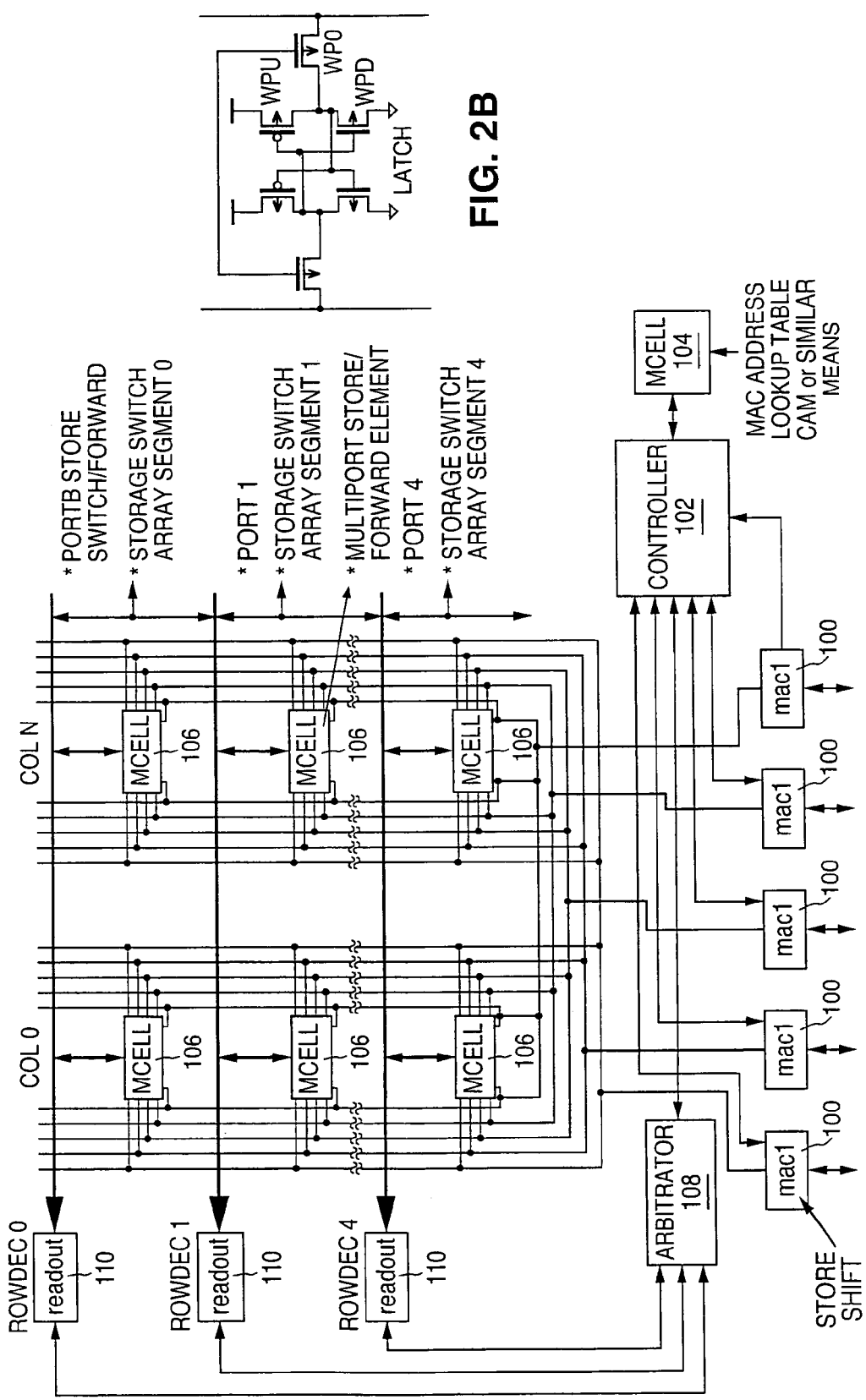

INTEGRATED HIGH SPEED SWITCH ROUTER USING A MULTIPORT ARCHITECTURE

RELATED APPLICATION

This application claims the benefit of U.S. Provisional Patent Application No. 60/178,218, filed in the U.S. Patent Office on Jan. 26, 2000, for "Integrated High Speed Switch Router Using a Multiport Architecture", which application is hereby incorporated herein in its entirety.

BACKGROUND OF THE INVENTION

1. Field of the Invention

The present invention relates to semiconductor integrated circuit devices and, in particular, to the integration of a store switch element into a multi-port memory cell in a switch router product.

2. Discussion of the Related Art

In a typical switch or router product, the incoming bit stream packet is separated into a header and a payload. The header is processed to determine if the packet's destination address exists in the domain of that switch router; if it does, then the payload is delivered to the corresponding destination port of that switch router.

As the speed of the incoming data stream increases, the time available both for checking the header in the switch router lookup table and for transferring the payload from the incoming port to the destination port decreases.

In current switch router architectures, there is typically enough buffer memory allocated to store the incoming bit stream while the data is being processed through the lookup table and routed to the destination port. However, incoming packets can get dropped if the incoming bit stream fills up the buffer memory. This can happen if it takes longer for header processing, header lookup or payload transfer.

As shown in FIG. 1, in currently available integrated monolithic switch router products, the Media Access Controllers (MACs) 10 and a single port, common pool buffer memory 12 are interconnected via a high speed data bus 14. A system controller 18 connected to a system bus 20 receives an incoming data packet from a receiving MAC port 10, strips the header from the packet and provides it to an address lookup table 22, shown in FIG. 1 as a content addressable memory (CAM); the packet payload is provided to the common pool buffer memory 12. An arbitrator 16 provides the arbitration for the data transfer from the receiving MAC port 10 to another, destination MAC port 10 via the high speed bus 14.

As can be seen from the FIG. 1 architecture, as the incoming bit stream speed increases from, for example, 10 Mbits/sec. to 100 Mbits/sec., or from 1 gigabit/sec. to 10 gigabit/sec., the speed of the high speed bus 14 must also scale up by 10 times to 1000 times. To address this disparity, a large pool of buffer memory must be provided to accomodate the peak switching load.

SUMMARY OF THE INVENTION

The present invention provides a novel switch router circuit architecture that integrates a multi-port memory with the Media Access Controller's (MACs) of the switch router circuit. The store and forward functions are performed using a single memory cell with multiple pass gates, one pass gate designated for each MAC port. Thus, in accordance with the invention, a switch router is implemented using the multi-port memory element such that the number of ports in the memory cell is proportional to the number of MACs integrated in the single monolithic chip. An arbitrator arbitrates between these integrated ports, a CAM element provides the port lookup table, and a system controller controls all of these elements.

A better understanding of the features and advantages of the present invention will be obtained by reference to the following detailed description and accompanying drawings which set forth illustrative embodiments in which the concepts of the invention are utilized.

DESCRIPTION OF THE DRAWINGS

FIG. 2 is a block diagram illustrating a multi-port memory integrated with MACs in accordance with the present invention such that store and forward is performed using a single memory cell with multiple pass gates designated, one for each memory port.

FIG. 2B is a schematic diagram illustrating a circuit embodiment of a latch utilizable in the FIG. 2A multi-port memory and pass gate structure.

DETAILED DESCRIPTION OF THE INVENTION

Figures 1, 2A:
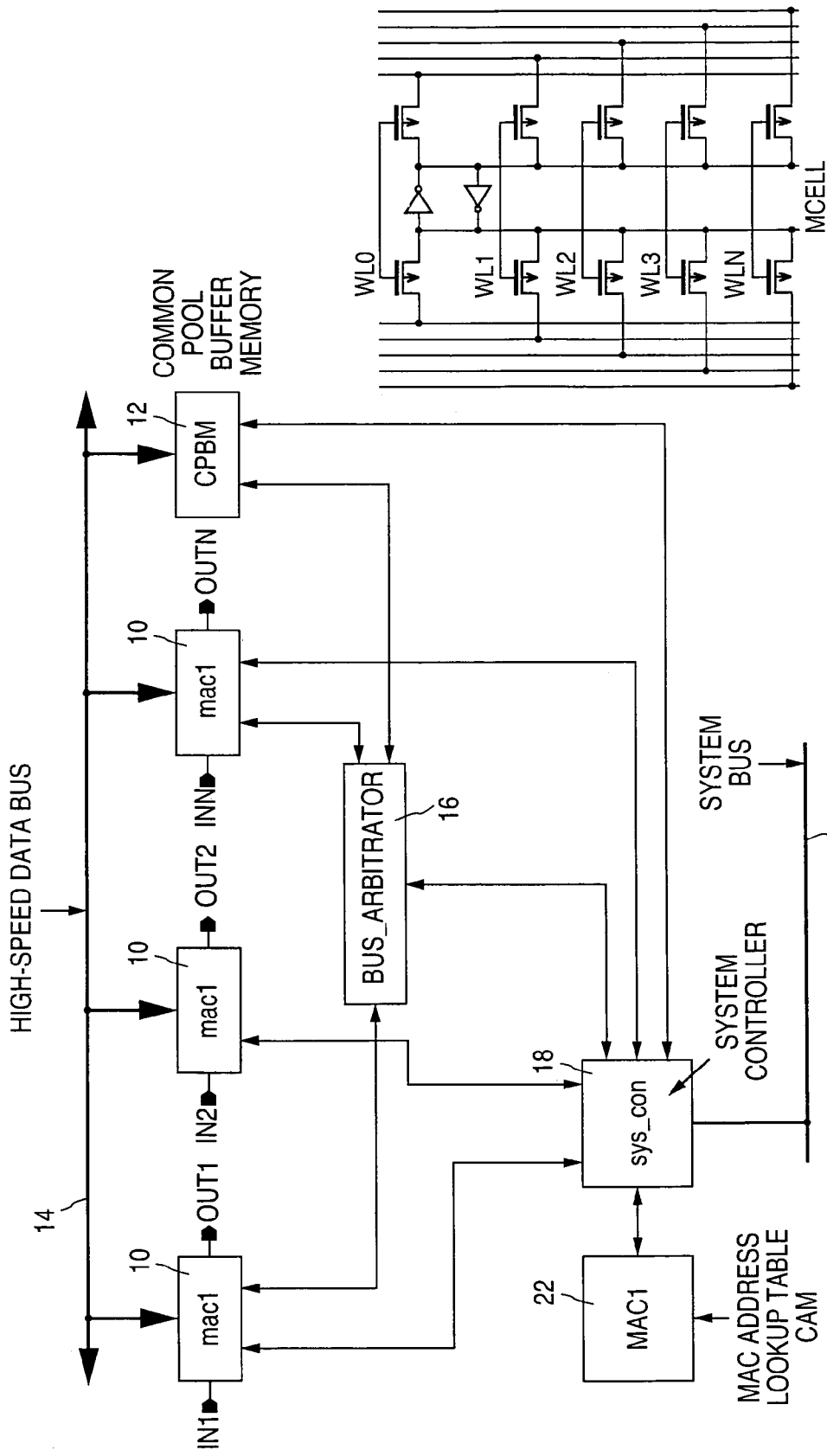
FIG. 1 is a block diagram illustrating a conventional switch router architecture in which multiple Media Access Controllers (MACs) and a single port buffer memory are connected through a high speed data bus.
FIG. 2A is a schematic diagram illustrating a circuit embodiment of a multi-port memory cell and pass gate structure utilizable in the FIG. 2 architecture.

In an embodiment of a switch router in accordance with the present invention, an incoming data packet is passed through one of a plurality of Media Access Controllers (MACs) 100 included in the switch router, as shown in FIG. 2. The packet header and the payload are separated by a controller 102 that sends the header information to lookup in a route table 104 (e.g. a content addressable memory) to determine whether the destination port is within the domain of the switch router. The corresponding packet payload is stored in the designated multi-port storage area 106 assigned to each incoming port. After the destination port has been identified, an arbitrator 108 arbitrates the pass gates of the incoming storage port memory element 106 to the pass gates of the outgoing storage port memory element 106 utilizing row decoders 110, whereby the incoming port is connected directly to the outgoing port, thereby facilitating direct transfer of the packet payload to the destination port.

An embodiment of a multi-port memory cell and pass gate structure 106 utilizable in accordance with the present invention is shown in FIG. 2A. In the FIG. 2A circuit, activation of a selected wordline (WL0-WLN) in the incoming storage port memory element 106 by its associated row decoder 110 facilitates transfer of packet payload data from the storage latch 106*a* of the incoming storage port memory element 106 to the latch 106*a* of the destination storage port memory element 106; activation of a selected wordline (WL0-WLN) in the destination storage port memory element 106 facilitates transfer of packet data to the destination atch 106*a*. Those skilled in the art will appreciate that the FIG. 2A circuit is an example of a number of pass gate/latch structures that can be utilized in implementing the concepts of the present invention.

A latch structure utilizable in the FIG. 2A multiport memory cell is shown in FIG. 2B. Again, those skilled in the art will appreciate that the FIG. 2B circuit is an example of a number of latch structures that can be utilized in implementing the concepts of the present invention.

In accordance with an aspect of the present invention, the multi-port memory/pass gate system 106 and decoders 110, the arbitrator 108, the controller 102, the MACs 104 and the CAM lookup table array 104 are all integrated into a single chip. However, if the lookup table 104 required is too large, then it can be accommodated through an external bus connected from the integrated switch router to an external CAM lookup table array.

As shown in FIG. 2, the number of columns (0-N) in the multi-port memory array is equal to the maximum number of bits to be stored per packet port storage memory element 106 divided by the number of rows. If the number of bits stored increases based on the wire speed, then the number of columns can be increased to switch the maximum number of bits from one port to another port in a single given cycle.

Also, one skilled in the art will appreciate that, from this architecture, multicasting can easily be done by opening more pass gates from the incoming store switch element 106 such that data from a single port can be multi-casted (multiple simultaneous accesses) onto multiple destination ports.

Figure 3:
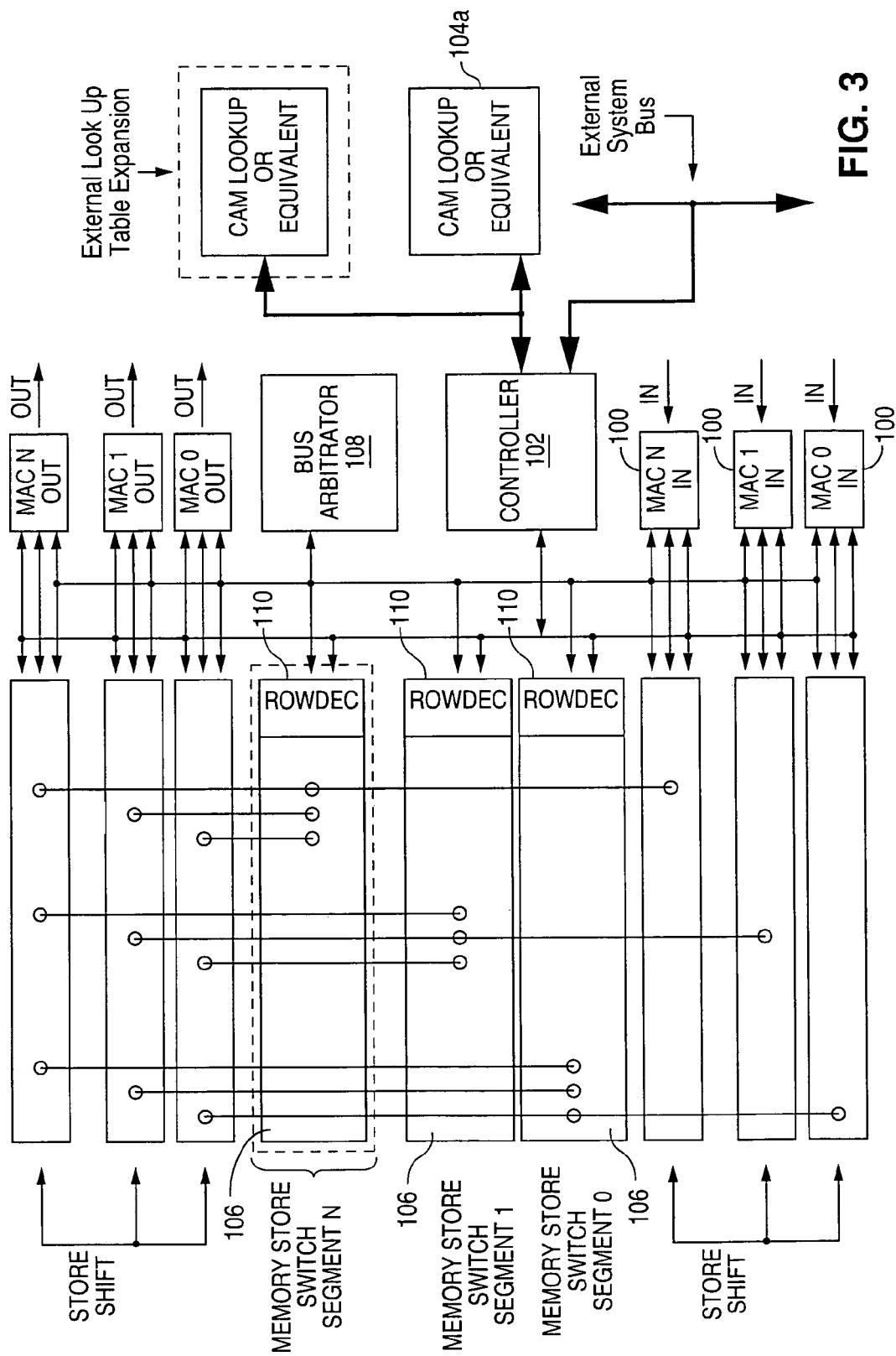
FIG. 3 is a block diagram illustrating a more detailed version of the FIG. 2 embodiment of the invention.

FIG. 3 shows an implementation of the FIG. 2 architecture at a higher level block representation. Like numerals identify like elements in FIG. 2 and FIG. 3. The FIG. 3 circuit shows an external CAM lookup table (or equivalent) 104*a* which, as stated above can be utilized in lieu of the integrated CAM lookup table 104, or which can be utilized in conjunction with the integrated lookup table 104 as an expansion module.

The Media Access Controllers (MACs) used in the illustrated embodiment are generally referred in Ethernet domain, but could be in any other domain, e.g., optical or similar.

In an alternate implementation in accordance with the invention, if multiple incoming ports access the same outgoing port, then the data can be prioritized and the incoming packets from multiple ports can be stored in a series of shift registers in the store shift elements in the FIG. 3 implementation, or in the store switch memory segments in the FIG. 3 implementation. Once the data is stored in either of these storage areas, then the prioritizer will prioritize and send the data through the outgoing port. Another way to accomplish this is to provide line buffer storage in each of the MAC elements and, when there is a conflict, the data iss stored in the line buffer until the prioritizer determines the priority and resolves the conflict.

Figure 4:
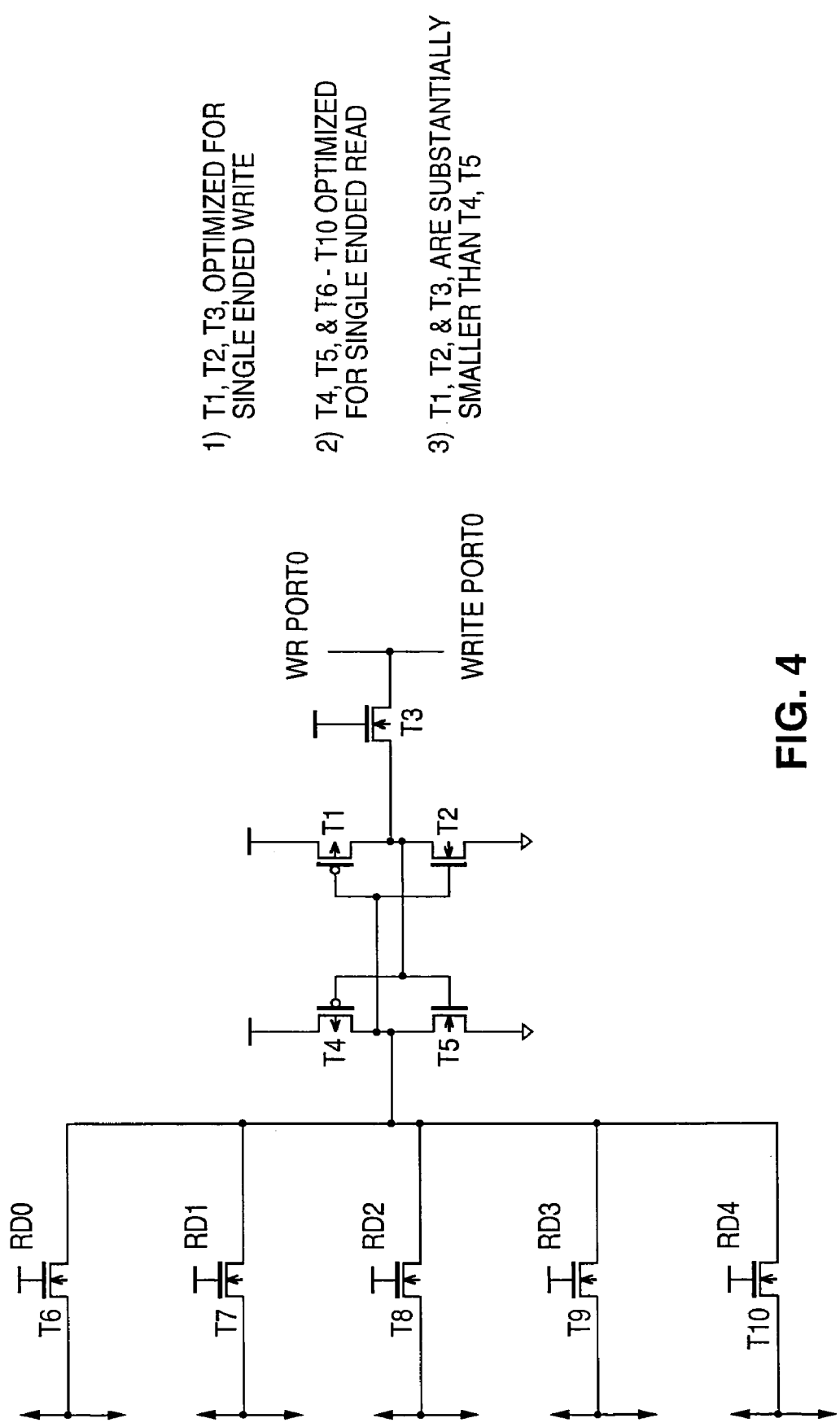
FIG. 4 is a schematic diagram illustrating an embodiment of a multi-port store switch element in accordance with the present invention.
Figure 5:
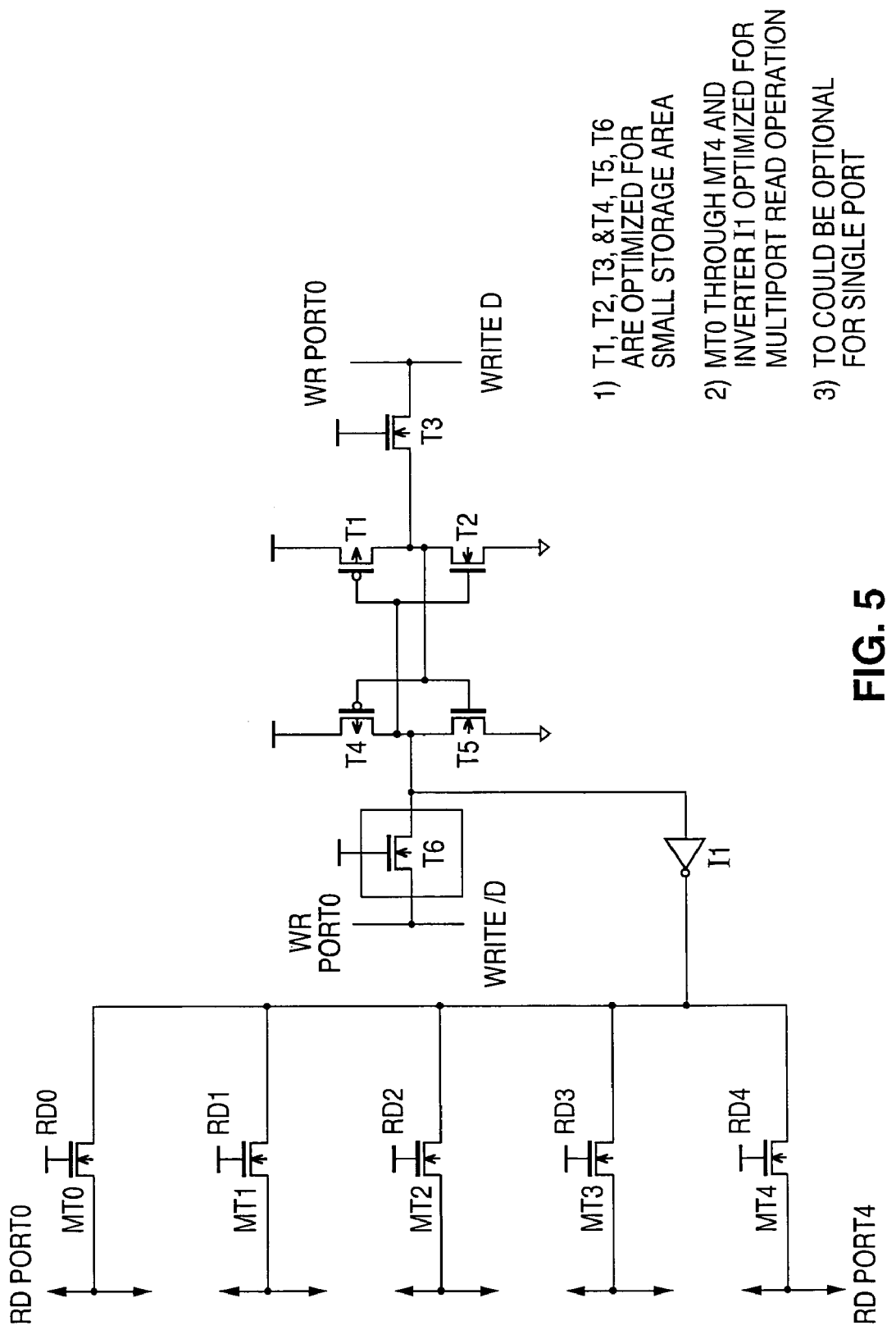
FIG. 5 is a schematic diagram illustrating an alternate embodiment of a multi-port store switch element in accordance with the present invention.
Figure 6:
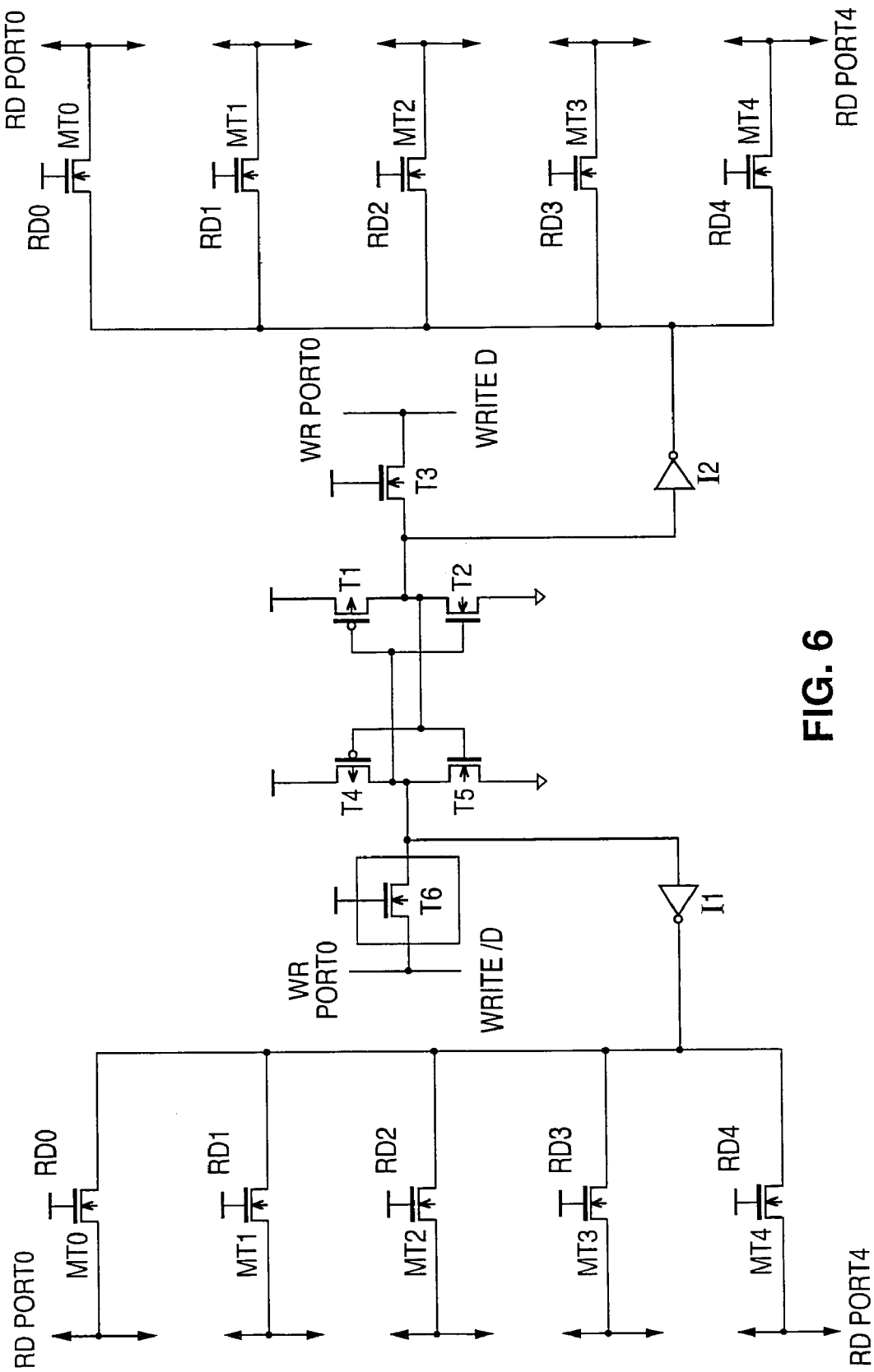
FIG. 6 is a schematic diagram illustrating another alternate embodiment of a multi-port store switch element in accordance with the present invention.

FIGS. 4, 5 and 6 show several alternative implementations of the multi-port store switch element 106 with the write path optimized without affecting the read path on multiple ports.

FIG. 4 shows an implementation for single ended write and single ended read. In the FIG. 4 circuit, devices T1, T2 and T3 are optimized for single ended write; devices T4, T5 and T6-T10 are optimized for single ended read. Devices T1, T2 and T3 are substantially smaller than devices T4 and T5.

FIG. 5 shows an implementation for double ended write and buffered multi-port read. In the FIG. 5 circuit, devices T1, T2, T3 and T4, T5, T6 are optimized for small storage area; devices MT0-MT4 and inverter 11 are optimized for multi-port read operation. Device T6 is optional for a single port implementation.

The FIG. 6 implementation is the same as the FIG. 5 implementation, but with double port write and buffered double port read.

Thus, the present invention provides integration of a system bus with common pool buffer memory into a single multi-ported or store switch element. Segmentation of the multi-port memory is provided whereby the number of memory segments is substantially equal to the number of ports in the store switch element. The number of pass gates in the storage switch element is substantially equivalent to the number of shift resistors (or to the number of serial-to-parallel or parallel-to-serial converters or their equivalent). An on-chip arbitrator arbitrates the data transfer from each multi-port switch memory port to the other ports. That is, an on-chip arbitrator arbitrates port communication and avoids port conflicts. An on-chip controller separates the packet header information and provides means for look-up in the lookup table for destination port identification. The integrated Media Access Controllers (MACs), arbitrator, segmented, multiport switch elements and an on-chip controller have bus expansion capability to the destination addresses (MAC address) lookup table and a system bus interface for communication with external controllers. In the latch (see FIG. 2B, for example), the width of the n-channel pull down device in the store switch element is substantially equal to 1.5 times the number of ports times the pass gate width, and the width of the p-channel pull up device is substantially equal to the pass gate width, assuming all channel lengths are similar. That is, $$WPD = 1.5 \times N \times Wpa$$

$$WPU = 1 \times Wpa$$

WPD=Width of pull down (N-Ch)
WPU=Width of pull up (P-Ch)
Wpd=Width of pass gate (N-Ch)
N=Number of ports In the memory switch segments, multiple memory switch elements from different segments are enabled simultaneously to communicate with non-overlapping ports. That is, multiple memory switch segments are selected simultaneously with multiple word lines enabled in each segment. The drains of the pass gate devices from each of the memory segments corresponding to each port are connected to the same corresponding port in the rest of the segments and a shift register or serial to parallel converter (or equivalent). The number of columns in a given memory switch array segment is substantially equal to the maximum number of bits to be stored per packet port storage divided by the number of rows.

As discussed above, the store switch (store forward) element (see FIG. 2A, for example) can be configured to do multicasting, where information sent on one port can be broadcasted on multiple ports. Multiple store segments can be multicasting simultaneously with non-overlapping ports; that is, port 1 can be multicasting to port 2 and 5 and port 3 can be multicasting to port 4 and 6.

As stated above, it should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A switch router circuit comprising:
    a plurality of Media Access Control (MAC) units, each MAC unit connected to a data bus for receiving incoming data packets from the data bus, each incoming data packet including a packet header and a packet payload, the packet header identifying a destination port to which the packet payload is to be transferred;
    a controller connected to the MAC units to receive the incoming data packets therefrom, and wherein, for each incoming data packet, the controller separates the packet header of said data packet from the packet payload of said data packet;
    a lookup table connected to the controller to receive packet headers therefrom, and wherein the lookup table utilizes a packet header to determine whether the destination port identified by said packet header is included within the plurality of MAC units of said switch router circuit;
    a multi-port store/switch memory array connected to receive packet payloads of incoming data packets, the multi-port store/switch memory array including a plurality of storage areas, each storage area being associated with a corresponding MAC unit such that a packet payload of an incoming data packet received by a MAC unit is stored in the corresponding storage area of the multi-port store/switch memory array; and
    an arbitrator connected to the multi-port store/switch memory array, and wherein the arbitrator, in the event that the destination port identified by the packet header of an incoming data packet is included within the plurality of MAC units of said switch/router circuit, arbitrates direct connection of the memory array storage area associated with the MAC unit that receives the incoming data packet to the MAC unit identified as the destination port, thereby facilitating direct transfer of the packet payload of the incoming data packet to the destination port and wherein each of the storage areas in the multi-port store/switch memory array includes a plurality of pass gates, one pass gate being associated with a corresponding one of the MAC units, and wherein each of the plurality of storage areas further includes a data storage element, such that the arbitrator arbitrates the pass gates of the incoming storage area to the pass gates of the outgoing storage area, whereby the packet payload is transferred directly from the data storage element of the incoming storage area to the date storage element of the outgoing storage area.

2. A switch router circuit as in claim 1, and wherein the arbitrator arbitrates direct connection of the memory array storage area associated with the MAC unit that receives the incoming data packet to multiple MAC units identified as destination ports, thereby facilitating multicasting of the packet payload to the multiple destination ports.

3. A switch router circuit as in claim 1, and wherein the multi-port store/switch memory array facilitates double ended write of incoming packet payloads and buffered multi-port read of outgoing packet payloads.

4. A switch router circuit as in claim 1, and wherein the multi-port store/switch memory array facilitates double port write of incoming packet payloads and buffered double port read of outgoing packet payloads.

* * * * *